United States Patent [19]
Olmstead

[11] 3,931,736
[45] Jan. 13, 1976

[54] IMPROVED FLUID FLOW SENSOR CONFIGURATION

[75] Inventor: John Aaron Olmstead, Somerville, N.J.

[73] Assignee: RCA Corporation, New York, N.Y.

[22] Filed: June 28, 1974

[21] Appl. No.: 484,092

[52] U.S. Cl. ............................................... 73/204
[51] Int. Cl.² .......................................... G01F 1/68
[58] Field of Search ........................... 73/204, 190 H

[56] References Cited
UNITED STATES PATENTS

| | | | |
|---|---|---|---|
| 3,336,804 | 8/1967 | Poppendiek | 73/204 |
| 3,490,283 | 1/1970 | Vidal et al. | 73/190 |
| 3,648,516 | 3/1972 | Paine | 73/190 |
| 3,754,201 | 8/1973 | Adams | 73/204 X |

FOREIGN PATENTS OR APPLICATIONS

| | | | |
|---|---|---|---|
| 651,152 | 3/1951 | United Kingdom | 73/204 |

OTHER PUBLICATIONS

Brown et al. "Steady–State Heat Flux Gauge" in Review of Scientific Instruments 32(8) pp. 984–985 8/61.

Primary Examiner—Herbert Goldstein
Attorney, Agent, or Firm—H. Christoffersen; R. P. Williams

[57] ABSTRACT

An improved fluid flow sensor configuration comprises a thin membrane of a low thermally conductive material having one surface in thermal contact with the heating and temperature sensitive elements of a fluid flow sensor and the other surface in thermal contact with a fluid whose flow rate is measured by the fluid flow sensor.

7 Claims, 2 Drawing Figures

IMPROVED FLUID FLOW SENSOR CONFIGURATION

This invention relates to an improved fluid flow sensor configuration having the heating and temperature sensitive elements of a fluid flow sensor separated from a fluid by a thin membrane of a low thermally conductive material.

Fluid flow sensors having their heating and temperature sensitive elements in a heat transfer relationship with a flowing fluid and positioned outside the flow cross-sectional area of a conduit through which the fluid flows are known. The conduit for such sensors usually comprises a pipe or cylinder of a high thermally conductive material which allows good heat transfer between the fluid in thermal contact with the internal surface of the conduit and the heating and temperature sensitive elements of the sensor which are in thermal contact with the exterior surface of the conduit. This arrangement protects the electrical elements of the sensor from direct contact with the fluid which might otherwise cause corrosion, contamination or explosion, and also enables the fluid flow to be sensed without actually inserting a probe into a flow channel of the conduit, which would disturb the flowing fluid by causing turbulence and thereby change the heat transfer characteristics of the sensor, making it difficult to calibrate and sometimes erratic.

The pipe or cylinder used as the fluid conduit is usually constructed of a high thermal conductivity material in order to provide a sensitive flow sensor which is thermally coupled to the fluid in the conduit. However, the use of such a material achieves good heat transfer not only between the fluid and the electrical elements of the sensor but also extensive lateral transfer of heat tangentially throughout the thermally conductive conduit, which is undesirable in those systems which utilize semiconductor devices for their heating and temperature sensitive elements.

IN THE DRAWINGS

Figure 1:
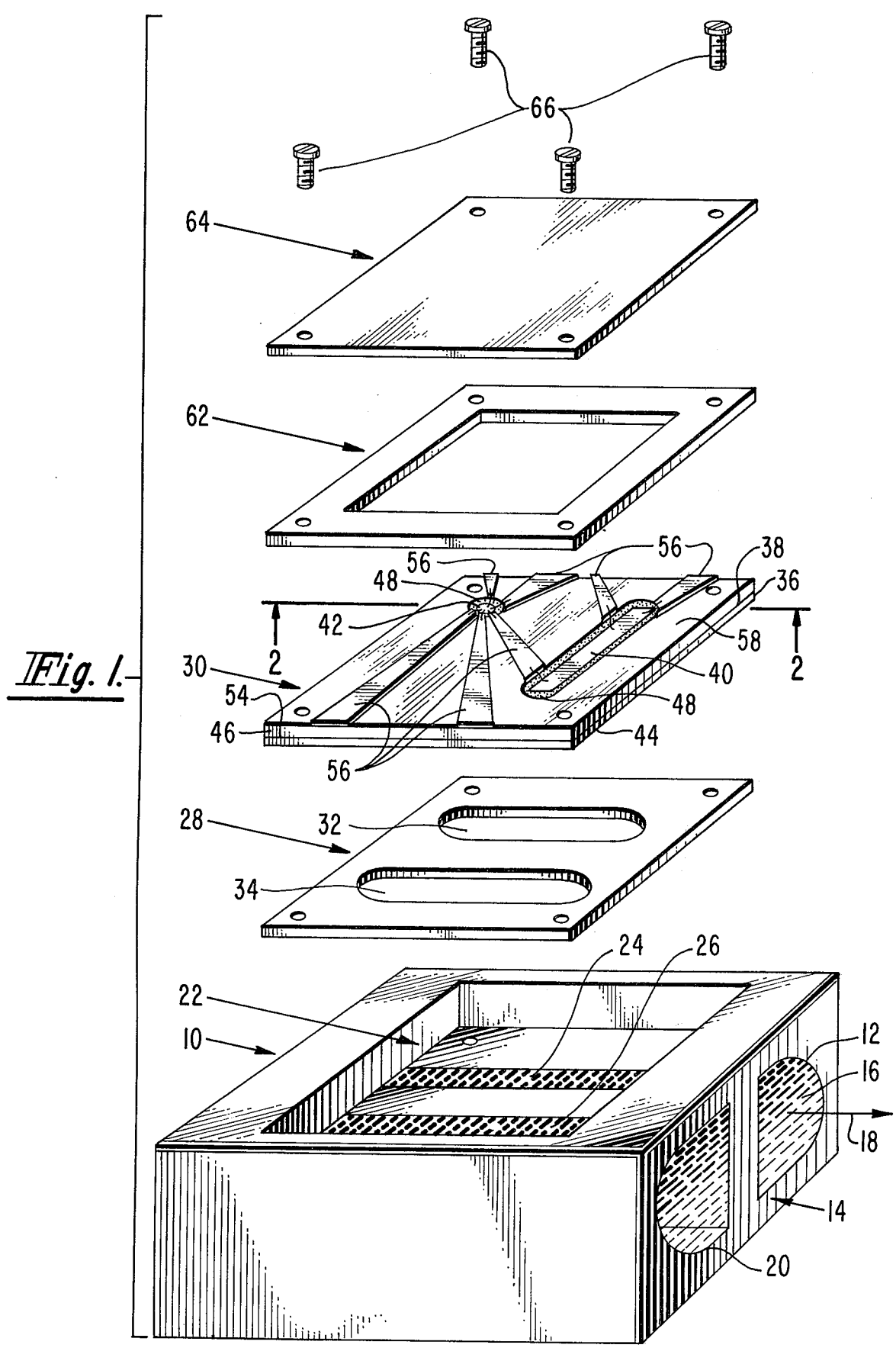
FIG. 1 is an exploded perspective view showing the components of a typical embodiment of the present improved fluid flow sensor configuration in the order of their assembly.

Referring to FIG. 1 of the drawings, there is shown a body 10, constructed, for example, of a die-cast metal, which forms a portion of the boundary of a first channel 12 of a conduit 14, containing a flowing fluid 16, shown by directional flow arrow 18. The body 10 also forms a portion of the boundary of a second channel 20 of the conduit 14 containing fluid 16 which is substantially stationary, commonly called a "dead" flow channel and used frequently in fluid flow measuring systems to obtain reference readings under conditions of substantially no fluid flow. The dead flow channel 20 is connected to the "live" flow channel 12 by two narrow chamber ducts (not shown) which restrict the flow of fluid 16 through the dead flow channel 20 but still allow enough flow to maintain the temperature of the fluid 16 therein the same as the ambient temperature of the fluid 16 entering the conduit 14. The body 10 has a recess 22 therein which intersects the channels 12 and 20 to provide openings 24 and 26 in the live flow channel 12 and dead flow channel 20 respectively.

A sealing gasket 28 made of, for example, rubber acts as a seal between a fluid flow sensor 30 and the portions of the body 10 adjacent the openings 24 and 26. The gasket 28 has two holes 32 and 34 therein which enable the fluid 16 in the live flow channel 12 and the dead flow channel 20 respectively to come into direct contact with the fluid flow sensor 30.

Figure 2:
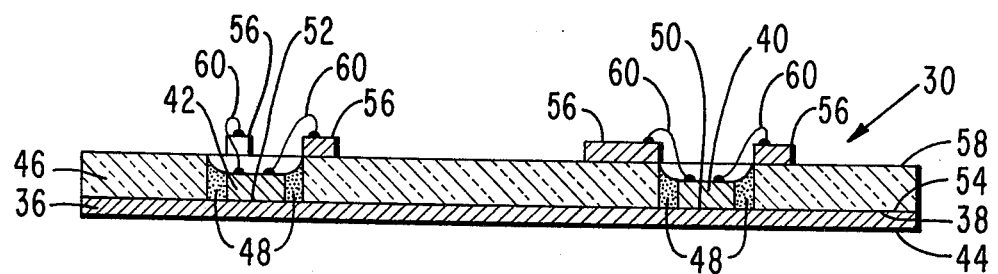
FIG. 2 is a cross-sectional view taken along line 2—2 of FIG. 1.

The fluid flow sensor 30 comprises a thin membrane 36 of a low thermally conductive material, such as, for example, Hastelloy C or stainless steel type 304, which has a first surface 38 thereof in thermal contact with first and second electrical elements 40 and 42 of the fluid flow sensor 30, and a second surface 44 thereof which is disposed adjacent to and covers the openings 24 and 26 thereby forming portions of the boundaries of the first and second channels 12 and 20. As shown in FIG. 2, the first and second electrical elements 40 and 42 are affixed in suitable apertures in an insulating substrate 46 by means such as an epoxy resin 48 which fills the space between the electrical elements 40 and 42 and the substrate 46. The epoxy resin 48 maintains first and second surfaces 50 and 52 of the first and second electrical elements 40 and 42, respectively, continuous and flush with a first surface 54 of the insulating substrate 46. The first surface 38 of the membrane 36 is disposed adjacent to the first surface 54 of the insulating substrate 46, thereby thermally coupling the first surface 38 of the membrane 36 to the first and second surfaces 50 and 52 of the first and second electrical elements 40 and 42, respectively, which are adjacent thereto. The substrate 46 may be constructed of an insulating material such as, for example, alumina which has thick or thin film circuitry disposed thereon, or may take the form of a printed circuit board which has circuitry 56 disposed on a second surface 58 thereof and bonded by wires 60, as shown in FIG. 2, to the first and second electrical elements 40 and 42. The circuitry 56 which, for example, may be gold-plated copper, interconnects the first and second electrical elements 40 and 42 and also provides contacts for connection to a fluid flow measuring system.

The thin membrane 36 may comprise a thin foil which is bonded to the first surface 54 of the substrate 46, or the thin membrane 36 may be formed by electroplating, vapor depositing, or sputtering the material onto the first surface 54 of the substrate 46 using a known conventional technique. The material used for the membrane should have a low thermal conductivity similar to that of Hastelloy or stainless steel. Hastelloy C and stainless steel type 304 are commercially available metallic alloys whose thermal conductivities are approximately 0.04 and 0.08 cal/sec—cm°C respectively and which are particularly desirable because of their resistance to corrosion. The membrane 36 should be extremely thin, having a thickness of approximately 250 micrometers or less.

The first and second electrical elements 40 and 42 are typically semiconductor chips which comprise heating and temperature sensitive elements of a fluid flow measuring system such as disclosed in my copending application, Ser. No. 484093, filed concurrently herewith. The first semiconductor chip 40 may be a long and thin integrated circuit chip 40 which has the portions of its surface 50 adjacent to the membrane 36 at its two ends in thermal contact with the sections of the membrane 36 which form portions of the boundaries of the first and second channels 12 and 20, respectively. By using this configuration different heating and temperature sensitive elements of a fluid flow measuring system may be thermally coupled to the fluid 16 in the different flow channels 12 and 20 and still be part of the same integrated circuit chip 40, since the heat being conducted between a particular element and the fluid 16 will not be readily conducted laterally along the membrane 36 to affect other elements in thermal contact with the membrane 36.

A spacer 62 of insulating material is disposed between the second surface 58 of the substrate 46 and a cover 64 which protects the fluid flow sensor 30. The parts are assembled in the order shown and secured together by means of, for example, bolts 66 extending through suitable openings in the cover 64, the spacer 62, the sensor 30, and the gasket 28 into tapped holes in the body 10.

Although this novel sensor configuration has been embodied as part of a fluid flow sensor 30 which has heating and temperature elements combined, it may be incorporated in any device to be thermally coupled to a fluid, including separate heating or temperature sensitive elements.

The thin membrane 36 of low thermally conductive material not only protects the electrical elements 40 and 42 of the fluid flow sensor 30 from direct contact with the fluid 16 and achieves efficient heat transfer between the electrical elements 40 and 42 and the fluid 16 due to its extreme thinness, but also reduces to a minimum the lateral transfer of heat tangentially throughout the membrane 36, due to its low thermal conductivity. This reduction in the lateral transfer of heat not only improves the sensitivity and response time of the fluid flow sensor 30 while lowering its power consumption, but also provides a practical and economical way of utilizing semiconductor chips for the electrical elements 40 and 42 of the sensor 30. Since the lateral heat conduction is minimized, several heating and temperature sensitive elements may be thermally coupled to the same protective membrane 36 which forms portions of the boundaries of different flow channels 12 and 20, thereby achieving uniformities and economies in production.

What is claimed is:

1. A fluid flow sensor configuration comprising:
   a conduit adapted to contain a fluid, said conduit including a live-flow channel and a dead-flow channel,
   a first electrical element and a second electrical element positioned to be adjacent to and in thermal contact with said fluid respectively in said dead-flow channel and said live-flow channel of said conduit, said first and said second electrical elements, in combination with additional circuitry, adapted to sense the flow of said fluid in said live-flow channel,
   a thin membrane of thermally conductive material positioned to be between said fluid and said electrical elements and having a first surface thereof adjacent to and in thermal contact with both of said electrical elements, said membrane having a thickness of approximately 250 micrometers or less and a thermal conductivity of approximately 0.08 cal/cm—sec°C or less in order to minimize the lateral transfer of heat throughout said membrane while keeping said electrical elements thermally coupled to said fluid, and
   means for supporting a second surface of said membrane adjacent to and as a portion of the boundary of said conduit whereby said membrane is disposed between said fluid and said electrical elements.

2. The fluid flow sensor configuration as defined in claim 1 wherein said first and said second electrical elements are semiconductor chips.

3. The fluid flow sensor configuration as defined in claim 2 wherein said first semiconductor chip comprises an integrated circuit chip having the two ends thereof positioned to be in thermal contact with said fluid in said live-flow and said dead-flow channels respectively.

4. The fluid flow sensor configuration as defined in claim 2 wherein said means comprises a means for mounting said membrane adjacent to an opening in each of said live-flow and said dead-flow channels, separate portions of said second surface of said membrane completely covering each of said openings respectively whereby said separate portions of said second surface contact said fluid in said conduit.

5. The fluid flow sensor configuration as defined in claim 4 further comprising a substrate of insulating material to which said first and said second semiconductor chips are affixed, said substrate having a first surface thereof disposed adjacent to said first surface of said membrane and having circuitry connected to said first and said second chips and disposed on a second surface thereof whereby said membrane is insulated from said circuitry.

6. The fluid flow sensor configuration as defined in claim 5 wherein said mounting means comprises:
   a sealing gasket disposed between said membrane and said conduit and having two holes therein, said holes exposing said portions of said second surface of said membrane to said fluid, and
   a cover positioned adjacent to a layer of insulating material and attached by fastening means to said conduit, said layer of insulating material being disposed between said second surface of said substrate and said cover whereby said first and said second semiconductor chips are electrically insulated from said cover.

7. The fluid flow sensor configuration as defined in claim 5 wherein said substrate is a printed circuit board.

* * * * *